US006433846B1

United States Patent
Omar et al.

(10) Patent No.: US 6,433,846 B1
(45) Date of Patent: Aug. 13, 2002

(54) APPARATUS FOR MAINTAINING AND CONVERTING A LOCALIZED POLARIZATION SHIFT INTO A LOCALIZED INTENSITY VARIATION IN A LCD DISPLAY ASSEMBLY

(75) Inventors: Basil Arthur Omar, Stanford in the Vale; Terence Edward Yeo, Newton Abbott, both of (GB)

(73) Assignee: Nashua Corporation, Nashua, NH (US)

( * ) Notice: Subject to any disclaimer, the term of this patent is extended or adjusted under 35 U.S.C. 154(b) by 0 days.

(21) Appl. No.: 09/380,511

(22) PCT Filed: Mar. 5, 1998

(86) PCT No.: PCT/GB98/00724

§ 371 (c)(1),
(2), (4) Date: Dec. 13, 1999

(87) PCT Pub. No.: WO98/39755

PCT Pub. Date: Sep. 11, 1998

(30) Foreign Application Priority Data

Mar. 6, 1997 (GB) .............................. 9704640
Oct. 31, 1997 (GB) .............................. 9723088
Dec. 5, 1997 (GB) .............................. 9725848

(51) Int. Cl.$^7$ .......................................... G02F 1/1335
(52) U.S. Cl. .......................................... 349/112; 349/96
(58) Field of Search .................................. 349/112, 113, 349/96

(56) References Cited

U.S. PATENT DOCUMENTS 5,418,631 A    5/1995  Tedesco ................... 359/15
5,737,042 A  * 4/1998  Shinohara ................ 349/112
6,147,732 A  * 11/2000 Aoyama et al. .......... 349/112

FOREIGN PATENT DOCUMENTS

EP   0 669 541 A1   8/1995   ............ G02B/5/02
EP   0 667 768 A1  10/1995   ......... G02F/1/1335
FR   2 737 799      2/1997   ............ G09F/9/36

OTHER PUBLICATIONS

Wadle et al., "Holographic Diffusers: Polarization Effects," *Optical Engineering* vol. 33, No. 4, pp. 1084–88 (Apr. 1, 1994).

* cited by examiner

Primary Examiner—Kenneth Parker
(74) Attorney, Agent, or Firm—Webb Ziesenheim Logsdon Orkin & Hanson, P.C.

(57) ABSTRACT

Disclosed herein is an apparatus for maintaining and converting a localized polarization shift into a localized intensity variation in a liquid crystal display assembly. The assembly includes a liquid crystal display having a back side and a front side, a polarization-maintaining, light-diffusing layer adjacent to the front side of the liquid crystal display, and a front light-polarizing layer disposed adjacent to the polarization-maintaining, light-diffusing layer. A method for maintaining and converting a localized polarization shift into a localized intensity variation in a liquid crystal display assembly also is disclosed.

3 Claims, 2 Drawing Sheets

APPARATUS FOR MAINTAINING AND CONVERTING A LOCALIZED POLARIZATION SHIFT INTO A LOCALIZED INTENSITY VARIATION IN A LCD DISPLAY ASSEMBLY

CROSS-REFERENCE TO RELATED APPLICATIONS

This application is the national phase of International (PCT) Patent Application Serial No. PCT/GB98/00724, filed Mar. 5, 1998, which claims priority to and the benefit of United Kingdom Patent Application No. 9704640.3, filed Mar. 6, 1997, United Kingdom Patent Application No. 9723088.2, filed Oct. 31, 1997, and United Kingdom Patent Application No. 9725848.7, filed Dec. 5, 1997.

FIELD OF THE INVENTION

THIS INVENTION relates to display devices, particularly, but not exclusively, to liquid crystal displays (LCDS) and is especially, but again not exclusively, of use in relation to back-lit LCD displays.

BACKGROUND OF THE INVENTION

A liquid crystal display conventionally comprises, in the case of a passive super twisted nematic display, a liquid crystal cell mounted between light-polarising sheets, the cell comprising a pair of transparent, (e.g. glass) plates spaced apart to define therebetween a space which is filled with the liquid crystal medium, the opposing surfaces of the glass plates, i.e. the surfaces adjoining the liquid crystal medium, being provided with transparent (e.g. tin oxide) electrodes. The application of appropriate potentials to these electrodes by controlling circuitry produces localised electric fields in the liquid crystal medium which produce localised variations in polarisation of polarised light passing through the cell via one of the light polarising sheets and thus produce corresponding localised variations in intensity of light transmitted from the cell via the other light-polarising sheet, the latter variations taking the form of desired textual or numeric representations, or pixelated graphic or video displays, for example, dependent on the particular application of the display. Multi-colour displays are typically provided for by red, green and blue filters mounted over respective pixel areas of the display and located, for example, on the glass plate bearing the corresponding pixel electrodes.

BACKGROUND

An alternative form of liquid crystal display, the active matrix TFT (thin film transistor) LCD is similar in structure to that described above, except for the incorporation on the electrode-bearing plates, of active electronic (semiconductor) components controlling the energisation of the individual electrodes, and except in some other respects which are of no relevance for the purpose of description of the present invention.

In back-lit LCDS, the source of the light directed through the liquid crystal cell or cells is a back-light assembly disposed behind the display. Front-lit LCDs are known, particularly as alpha-numeric displays, in which a reflector disposed behind the LCD serves to reflect ambient light reaching the reflector through the LCD back through the LCD to the viewer. (In front lit LCDs, assuming that polarisation is preserved by the reflector, only a single polarising sheet, on the outer side of the liquid crystal cell, may be required).

Super twisted nematic (STN) LCDs suffer from poor performance at wide viewing angles from the normal, (i.e. perpendicular) due to the optical characteristics of the liquid crystal materials. This is manifested in low contrast and colour inversion at high viewing angles. STN LCDs have also, in the past, suffered from slow response speed making the display technology inappropriate for live video. Recent technical developments such as dual scan addressing techniques have increased the response speed of STN LCD panels (i.e. displays) to levels very close to video rates.

Despite the better performance of the technically superior active matrix TFT LCDs, passive STN LCD panels are still used in many consumer products in preference, due to their significantly lower costs, and further technical developments and improvements are expected to increase this trend further.

Several techniques have been suggested for extending the useful viewing angles of back-lit LCD panels in general and those of STN LCD panels in particular. One such method, disclosed in "Viewing-angle-enhancement system for LCDs", S. Zimmerman et al. Journal of Society for Information Display, Volume 3, 1995, pp 173–176, involves the introduction of an optical element in the backlight assembly to reduce the divergence of the light incident on the LCD panel. A second optical element, acting as a diffuser, is then positioned on the outer surface of the outer polariser (i.e. that further from the back-light assembly), which diffuser acts to redistribute the light over the chosen viewing angle.

Collimating the light output of the backlight assembly, so that the maximum of light from the backlight assembly passes normally through the LCD, i.e. perpendicular to the major plane of the display, maximises the contrast potentially available, whilst the diffuser in front of the display allows the high contrast obtained to be perceived over a wider viewing angle than would be the case without the diffuser. (Generally, without such a diffuser, the perceived contrast and brightness fall off rapidly away from the normal, i.e. perpendicular, viewing angle).

Despite the good performance of the arrangement disclosed in the Zimmerman et al article referred to above, that arrangement, and in particular the provision of the second optical element or diffuser on the outer surface of the outer polariser, as described in that article, has several disadvantages and limitations. In that arrangement, the light is redistributed in the diffuser by an array of 3-D micromachined surface structures formed in micro-optical films and which employ Total Internal Reflection (TIR) light channelling. The surface relief micro-optical film, with a thickness of up to 400 $\mu$m, needs to be positioned on the outer face of the outer polariser and cannot be sandwiched between the outer polariser and the liquid crystal cell for example. Bonding of such micro-optical film by means of adhesive to the outer polariser would reduce the effectiveness of the film as a diffuser because the adhesive would serve, to some degree as a refractive-index matching medium and would therefore reduce the effect of the surface relief features. Due to its fragility such a surface relief micro-optical film requires a further protective glass plate with an appreciable air gap and with additional anti-reflection coatings. Due to the regularity of the micro-optical elements there is high risk of Moire interference effects between the diffuser and the black mask of the LCD panel. The multitude of components coupled with the inflexibility and complexity of the optical design and manufacture result in a very expensive and bulky addition to what should, from the viewpoint of the consumer product manufacturer, be a low cost display.

SUMMARY OF THE INVENTION

It is among the objects of the present invention to provide an improved LCD display which avoids or reduces the above-noted disadvantages.

According to one aspect of the present invention, there is provided a display incorporating a screen comprising a light-polarising sheet and a polarisation-maintaining (non-birefringence) light diffusing sheet or layer disposed in front of or behind said light polarising sheet, and spaced therefrom, or in contact therewith or bonded thereto. Alternatively, the screen may comprise a light-polarising sheet which itself acts as a polarisation-maintaining diffuser, for example as a result of the relief optical features on a surface thereof or as a result of bulk features incorporated in the polarising sheet.

According to another aspect of the invention, there is provided a liquid crystal display of the kind comprising a liquid crystal cell or cells with a light-polarising sheet disposed in front of the liquid crystal cell or cells whereby the liquid crystal cell can be viewed through said light polarising sheet, characterised in that a polarisation-maintaining (non-birefringence) light diffusing sheet or layer is interposed between the liquid crystal cell and said light-polarising sheet or is disposed in front of the light polarising sheet.

According to another aspect of the invention there is provided a liquid crystal display of the kind comprising a liquid crystal cell or cells mounted between light-polarising sheets, the display being adapted to be viewed through one such light-polarising sheet, herein referred to as the front polarising sheet when illuminated through the other such light-polarising sheet, herein referred to as the back light-polarising sheet, characterised in that a polarisation-maintaining (non-birefringence) light-diffusing sheet or layer is interposed between the liquid crystal cell and the front polarising sheet.

According to still another aspect of the invention, there is provided a liquid crystal display of the kind comprising a liquid crystal cell or cells mounted between light-polarising sheets, the display being adapted to be viewed through one such light-polarising sheet, herein referred to as the front polarising sheet when illuminated through the other such light-polarising sheet, herein referred to as the back light-polarising sheet, characterised in that a polarisation maintaining (non-birefringence) light-diffusing sheet or layer is disposed on the front polarising sheet and is thus interposed between the front polarising sheet and the eye of the viewer.

In embodiments of the invention according to any of the above aspects, the diffuser may comprise a discrete sheet spaced from the outer polariser and/or from the liquid crystal cell, or may be bonded to the outer polariser and/or to the crystal cell or may form a coating on one or the other of these components.

It is a further object of the invention, in another of its aspects, to improve the efficiency of back-lit LCD displays.

According to this aspect of the invention, there is provided an LCD display of the kind comprising a liquid crystal cell interposed between a front light-polarising sheet or analyser and an arrangement for directing appropriately polarised light through said liquid crystal cell and said front polarising sheet or analyser, said arrangement including a light source, a diffuser arranged in front of the light source, and a reflective polariser arranged in front of the diffuser and thus disposed in a location between the liquid crystal cell and the diffuser, characterised in that the diffuser is a polarisation maintaining (non-birefringent) light-diffusing sheet or layer.

Preferably, said reflective polariser is a cholesteric filter arranged in front of the diffuser and a quarter wave plate is arranged in front of the cholesteric filter and thus disposed in a location between the liquid crystal cell and the cholesteric filter.

Alternatively, the reflective polariser may utilise the phenomenon of polarisation of light by reflection from smooth dielectric surfaces, classically investigated by Brewster, and may, for example, comprise a plurality of substantially planar interfaces between media of different refractive indices, inclined with respect to the direction of incidence, to the reflective polariser of light from said light source.

Preferably, in any of the above aspects, the polarisation-maintaining light-diffusing sheet or layer comprises a photopolymer incorporating graded refractive index optical features.

Preferably the graded refractive-index optical features are randomly distributed through the photopolymer.

According to yet another aspect of the invention, there is provided a light diffusing sheet or screen which is partly light reflecting and partly light-transmitting.

According to a still further aspect of the invention, there is provided an LCD display comprising a liquid crystal cell or cells with a light polarising sheet disposed in front of the liquid crystal cell or cells whereby the liquid crystal cell can be viewed through said light-polarising sheet, the display further comprising a screen according to the immediately preceding aspect disposed behind the liquid crystal cell and a light source disposed behind the partly light-reflecting, partly light transmitting screen, whereby the display can be viewed in ambient light, with said light source de-activated, so that ambient light passing through the liquid crystal cell to said partly reflective screen will be reflected thereby to return through the cell for viewing, and so that in low levels of ambient lighting, the light source can be activated to produce light to pass diffusely through said screen and through the liquid crystal cell and the polarising sheet, to the viewer.

According to a yet further aspect of the invention there is provided an LCD display comprising a liquid crystal cell or cells with a light polarising sheet disposed in front of the liquid crystal cell or cells whereby the liquid crystal cell can be viewed through said light-polarising sheet, the display further comprising a fully reflective, light diffusing sheet or screen disposed behind the liquid crystal cell whereby the display can be viewed in ambient light so that ambient light passing through the liquid crystal cell to said fully reflective, light diffusing screen will be reflected thereby to return through the cell for viewing.

BRIEF DESCRIPTION OF THE DRAWINGS

Embodiments of the invention is described below by way of example with reference to the accompanying drawings in which.

DETAILED DESCRIPTION OF PREFERRED EMBODIMENTS

Figure 1:
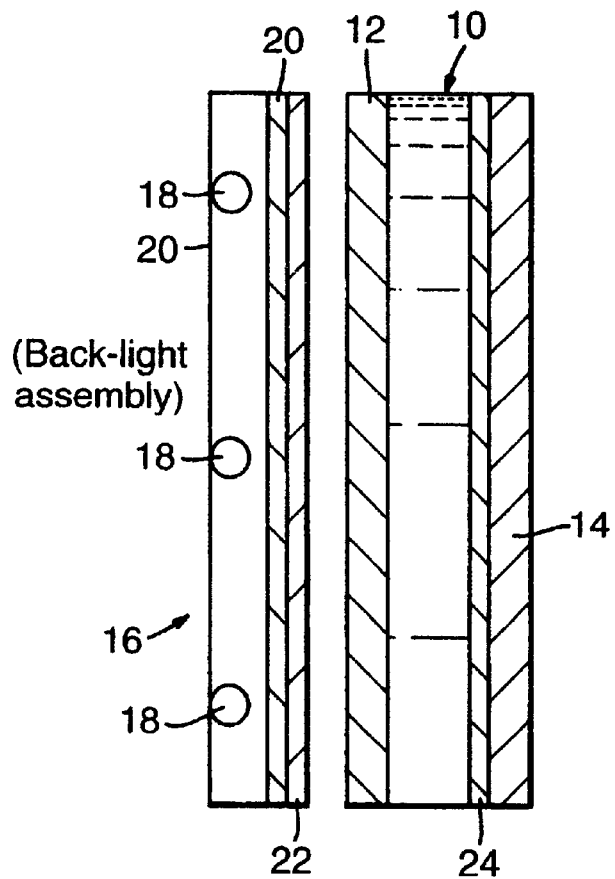
FIG. 1 is a schematic sectional view of a display embodying the present invention.

Referring to FIG. 1, the reference 10 indicates a liquid crystal cell (the individual components of which, such as the liquid crystal medium, the containing glass plates, electrodes, etc. are not shown), while the reference 12 indicates the back polariser, placed against the back face of the liquid crystal cell, and the reference 14 indicates the front polariser, the front face of which is provided with the conventional anti-glare/anti-reflection, etc. surface coating or treatment. Reference 16 indicates generally a conventional back-light assembly, comprising light sources 18, for example gas discharge tubes, with structures 20 adapted to distribute the light from the sources 18 uniformly over the display and a light-collimating film or other structure 22 adapted to bring the light emanating from structure 20 into closer approximation to light which is parallel and perpendicular to the major plane of the LCD.

The display shown differs from a conventional display of this type in that a polarisation maintaining, light diffusing sheet or layer 24 is sandwiched between the liquid crystal cell 10 and the front polariser 14. The diffuser 24 is polarisation-maintaining in the sense that light which is polarised before entry to the diffuser 24 remains correspondingly polarised after passing through the diffuser, without depolarisation and typically without appreciable rotation of the plane of polarisation, for example, in the case of plane-polarised light passing normally through the diffuser. Accordingly, the front polariser 14 remains effective to convert the localised variations in polarisation shift imposed by the liquid crystal cell on light passing through the latter, into the desired intensity variations to be perceived by the viewer, without the intended display becoming degraded (e.g. loss of contrast) or "scrambled" by the diffuser.

The polarisation-maintaining, light-diffusing layer 24 preferably comprises a photopolymer incorporating an array, preferably a random array, of graded refractive index optical features. By way of example, the layer 24 may be formed by any of the techniques disclosed in any one or more of EP-A-0294122; U.S. Pat. No. 5442482; WO94/29768; WO96/20419 in which a layer or sheet of a photopolymerisable material is exposed to a pattern (which term is intended to include an enti-rely random distribution) of polymerising radiation varying spatially in intensity so as to produce localised variation in degree of polymerisation and hence of refractive index, with or without corresponding localised surface relief features and thus localised variations in the thickness of the layer, which, where they occur, enhance the diffusive effect of the graded refractive index variations. The photopolymer used may be that supplied by Du Pont under the Registered Trade Mark OMNIDEX and having the type designation HRF150 or HRF600. The monomer in the HRF series photopolymers is fluorescent N-vinyl-carbazole (NVC) dispersed in a plasticized polyvinyl acetate (PVAC), cellulose acetate butyrate (CAB) or polyvinyl butyrate (PVB) as the polymeric binder. The material may be initiated either by photoinitiators or by a photosensitizing dye/initiator combination.

The OMNIDEX materials are available in sheet form, comprising a layer of the monomer on a polyester film base (MYLAR) the layer being entirely covered with a polyester (MYLAR) film.

It is possible that effective polarisation maintaining diffusers can be fabricated by imposing surface relief patterns on other transparent materials without inducing refractive index variations, for example by moulding, embossing or casting techniques.

Many of the limitations of the prior art are overcome by using a polarisation maintaining diffuser in the arrangement illustrated. The film or layer 24 preferably contains very small scale graded refractive index features within the bulk of the optically recorded non-birefringence polymer film. The film or layer 24 is preferably very thin, for example having a total thickness of 100 μm although the thickness could be significantly less. The volumetric diffusion properties and polarisation preserving properties of the film or layer 24 enable it to be laminated directly to the underside (i.e. rear surface) of the front polarizer 14 of the LCD panel. This both serves to protect the element and reduces the effect of ambient light in relation to the contrast of the displayed image. Most standard LCD front polarisers are treated as standard with anti-glare/anti-reflection front surfaces or coating and the application of layer 24 to the rear surface of the front polariser does not interfere with the operation of such anti-glare/anti-reflection measures, which are preferably likewise used in embodiments of the invention.

As described in more detail in WO96/20419, graded refractive index photopolymer diffusers, such as that proposed for diffuser 24 may be produced with a controlled degree of asymmetry in their light-diffusing properties, i.e. may be produced so that light incident normally on the diffuser will be scattered or diffused over a wider angle in one plane perpendicular to the plane of the diffuser than in a perpendicular plane which is also perpendicular to the plane of the diffuser. Furthermore, and as described in WO96/20419 it is possible to provide a photopolymer graded refractive index diffuser with a skewed diffusion profile, so that if light is directed normally (i.e. perpendicularly) onto the diffuser, for example, the highest intensity in the corresponding diffused light emerging from the diffuser is along a vector which is inclined somewhat relative to the normal to the diffuser. Such a skewed diffusion profile can, for example, be obtained by directing the polymerising radiation onto the photopolymerisable material at a selected oblique angle, rather than normally, during exposure of that material, in production of the light diffusing layer or film 24. The use of a diffuser 24 having a skewed diffusion profile makes it possible, when desired, to displace the optimum viewing angle for the LCD panel to a specific chosen viewing angle away from the normal, or alternatively, for LCD display panels which exhibit asymmetric viewing properties such that, without correction, the optimum viewing angle is not perpendicular to the plane of the LCD, makes it possible to displace the optimum viewing angle back towards the normal. The random nature and distribution of the optical elements in the preferred form of diffuser 24 also ensures that no Moire interference or other undesired optical artifacts occur.

Where the LCD display is a pixelated graphic or video display the positioning of the diffusing element 24 at the front surface of the LCD in close proximity to the pixels, with careful design, serves to depixellate the pixels by removing visibility of the black matrix surrounding the individual pixels in such LCD displays, creating a clearly more natural looking image whilst preserving the resolution of the image.

Whilst, as indicated above, the preferred location for the diffuser 24 is on the back side of the front polariser 14, i.e. the side adjoining the liquid crystal cell 10, the diffuser 24 may be located on the front surface of the front polariser 14, but the applicants have found such an arrangement to yield generally inferior results.

Figure 2:
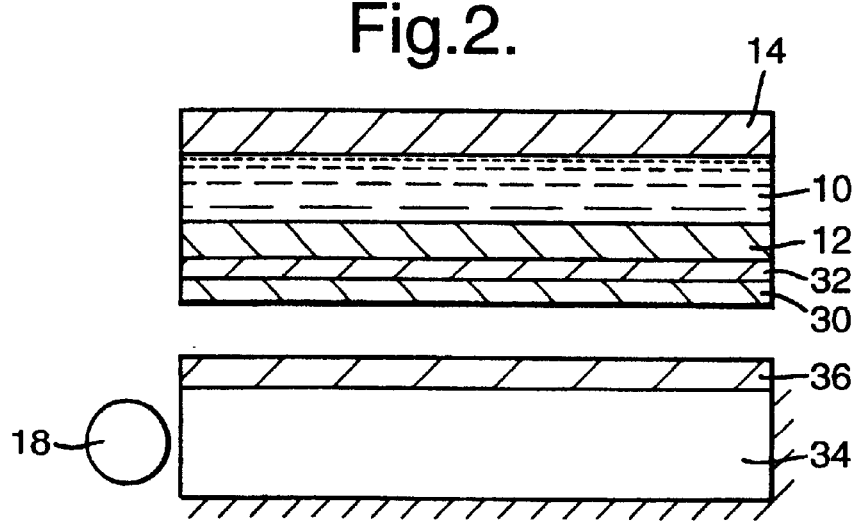
FIG. 2 is a schematic sectional view, similar to FIG. 1, of an LCD display arrangement as proposed in the D. J. Broer et al, Proc. SID Asia Display '95 article referred to above and also corresponds, in configuration, to an improved LCD display embodying the present invention.

As in the LCD display described above with reference to FIG. 1, most common liquid crystal displays (LCDS) employ dichroic sheet polarisers between the illumination source and the liquid crystal cell. Referring to FIG. 2, these sheet polarisers (again referenced 12 and 14 in FIG. 2)

selectively absorb one of the two orthogonal linearly polarised components of the incident light. In the ideal case only 50% of the light is absorbed at this stage, but in practice this figure is nearer 60%. Such losses affect the display performance and have a direct impact on the display's power consumption and hence the lifetime of the battery. This is particularly important in portable electronic products which rely on LCD displays such as lap-top computers, personal television, video and digital cameras, hand-held electronic organisers, GPS systems and the like.

Cholesteric liquid crystals, in which the orientation of the molecules varies in a helical fashion, can be utilised to fabricate polarisation selective mirrors where the mirrors reflect circularly polarised light of the same handedness as the cholesteric helix while transmitting the orthogonally circularly polarised light. (S. V. Belayev et al, Jap. J. Appl. Phys. 29, L634 (1990); M. Schadt et al, J. Appl. Phys. 29, 1974 (1990); N. Häberle et al, IEEE 1991, Proc. SID conference, San Diego, p. 57, (1991); J Lub et al, Liquid Crystals 18, 319 (1995); D. J. Broer et al. Proc. SID Asia Display '95, Hammamatsu, Japan, page 735 (1995) D. J. Broer et al, Nature, vol 378, Nov. 30, (1995)). The performance of these devices has been extended to cover a large optical bandwidth by introducing in the LC polymer a gradient on the helix pitch in the lateral direction.

These developments have created an application for these materials in the backlights of LC displays by recycling the unwanted polarised light. Inserting a pitch-gradient cholesteric layer combined with a quarter-wave plate between the backlight diffuser and the dichroic polariser of a prototype LCD has yielded up to 40% more light throughput according to a paper by D. J. Broer et al. Proc. SID Asia Display '95, Hammamatsu, Japan, page 735 (1995). The last-noted paper is hereinafter referred to, for brevity, as "the paper by D. J. Broer et al".

FIG. 2 illustrates the prototype LCD display referred to above and disclosed in the paper D. J. Broer et al.

Components in FIG. 2 corresponding to components in FIG. 1 have the same references.

In FIG. 2, references 18, 34 and 36 indicate a back lighting arrangement for projecting light through a reflective cholesteric reflector/filter 30, and thence through quarter wave plate 32, to pass through back dichroic polarising plate or film 12, through liquid crystal cell 10 and through front polarising plate or film 14 (also referred to herein as the analyser) whence the transmitted light passes from the display for viewing. In the arrangement illustrated in FIG. 2, the back-lighting arrangement is of a type known per se, comprising a fluorescent tubular lamp 18 extending along one side of a (typically rectangular in plan) waveguide or light guide structure 34 defining a chamber with light-reflective back wall arranged to direct light from the lamp 18 through a diffuser foil or plate 36 towards the liquid crystal cell.

As shown in FIG. 2, the light from the backlight is diffused by the diffuser foil 36 and is then incident on the cholesteric reflective polariser 30. Roughly 50% of the light is transmitted as circularly polarised and passes through quarter wave plate 32 which converts it to linearly polarised light. This is then incident on the dichroic polariser 12 which is so oriented that its polarisation plane is parallel with the plane of the incident linearly polarised light from quarter wave plate 32. Meanwhile, the light reflected by the cholesteric reflector/filter 30 (and comprising roughly 50% of the light originally incident on the cholesteric filter 30), passes again through the diffuser 36 into the light guide structure 34 which reflects it back again to pass again through diffuser 36 towards the cholesteric reflector 30 and liquid crystal cell 10. Some of the light reflected by polariser 30 is, of course, simply scattered back towards polariser 30 by the diffuser 36 without passing through diffuser 36. The light reflected by polariser 30, circularly polarised in the opposite sense from the light transmitted by polariser 30, becomes depolarised on forward- and back-scatter by the diffuser 36. Consequently, a fraction of the light energy reflected back towards the back-lighting arrangement by the polariser 30 is transmitted by the polariser 30 after being returned by the back-lighting arrangement. As this process of polarisation by reflection, depolarisation and back reflection may be repeated many times, yields of appropriately polarised light substantially greater than 50% of the light generated by lamp 18 are possible as long as absorption is suppressed. It is inevitable however that several passes may be required and absorption losses will be significant. This is evident from the fact that the prototype LCD display described in the above-noted Broer article in FIG. 2 gave an increase in light throughput, through the liquid crystal cell, of only 40% (compared to the theoretical 100% increase), over a corresponding conventional LCD display without a cholesteric reflector.

It is among the objects of the present invention significantly to increase the percentage light throughput through the liquid crystal cell, as compared with the proposal described in the paper by D. J. Broer et al.

The system described above with reference to FIG. 2 and in the paper by D. J. Broer et al relies on scrambling, by the diffuser 36, of the state of polarisation of the light reflected by the cholesteric mirror. Most diffusing materials by their very nature act to depolarise incident light and this is exploited in the multiple pass approach. The arrangement described below, (again with reference to FIG. 2), however, relies on preserving the state of polarisation of the light reflected by the cholesteric reflector, thus reducing the number of passes (to a theoretical two passes) and significantly reducing losses.

In the arrangement, in accordance with the invention, to be described below, the conventional polarisation randomising diffuser foil 36 of the LCD backlight arrangement in the Broer et al prototype is replaced by a polarisation preserving diffuser, of the kind referred to above in relation to FIG. 1, comprising a photopolymer incorporating graded refractive index optical features, and/or surface relief optical features, produced by exposure of an appropriate photopolymerisable material, e.g. one or other of those specified above, to a pattern of localised variation in illumination by polymerising light. Thus, the diffuser may be of the kind disclosed as the preferred embodiment in WO94/29768. In the resulting LCD, configured in accordance with FIG. 2 and incorporating a polarisation-maintaining diffuser 36, the light reflected off the reflective polariser 30 has its state of polarisation preserved—despite reflection from or passage through the diffuser 36. Ultimately the light will undergo a near 180 degree reflection from the diffuser 36 or the backlight reflector 34. In undergoing this reflection, the state of polarisation of the light also undergoes a 180 degree rotation and the light is then circularly polarised in the opposite sense, i.e. with the opposite "handedness". This state of polarisation is again maintained on its pass through the diffuser 36 and is now of the correct orientation to be transmitted through the cholesteric reflective polariser 30 on only this second pass. There will be some small percentage of light which does not strike the back light reflector 34 at exactly 180 degrees, so some small component of the light will undergo further passes, but the net gain in light throughput is nevertheless very significant compared to the prototype disclosed in the paper by D. J. Broer et al.

It may be possible to improve currently available cholesteric polarising reflection, to the extent that the back dichroic polariser 12 may be omitted, the combination of such improved cholesteric reflector and the quarter wave plate affording sufficiently plane polarised light to achieve the desired high contrast in the display. The invention will also be applicable to displays of the last-noted kind.

The article "Improvement of Backlighting Method by Means of Light Pipe Polariser", by M. Suzuki et al in "Euro Display '96" (1996) pages 229 to 232 discloses a backlighting arrangement for an LCD display which takes the form of a so-called light pipe in the form of a plate-like structure having a light source extending along one edge and arranged to direct light into the structure which is occupied by superimposed plates or layers of transparent materials of two different refractive indices and with boundary planes therebetween inclined at 45° to the light incident from the light source and to the major planes of the plate-like structure and of the superimposed LCD display, whereby polarised light is reflected at said boundary planes to pass through the LCD or to pass, in the opposite direction, to a rear reflector from whence the polarised light is reflected to pass through the superimposed sheet materials and thence to the LCD.

Figure 3:
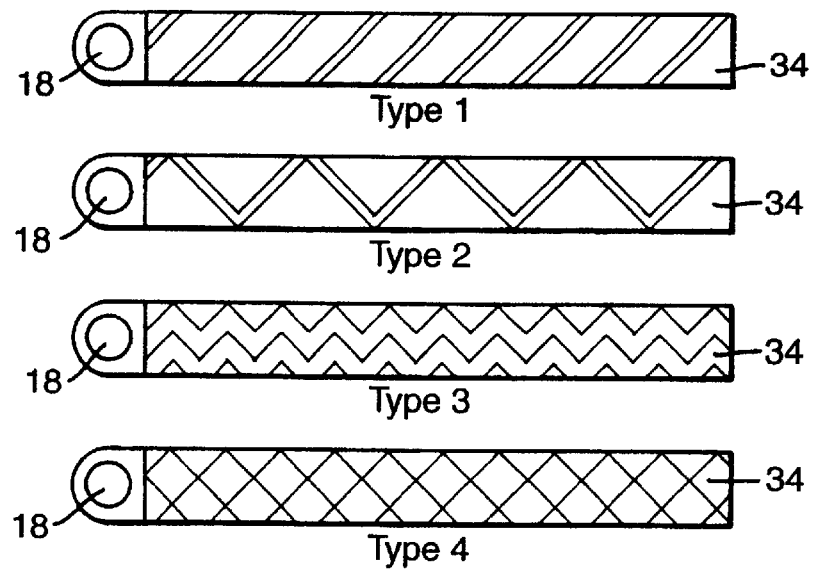
FIG. 3 shows schematic sectional views of various forms of an alternative source of polarised light.

FIG. 3 herein is a reproduction of FIG. 2 of the above-noted M. Suzuki et al article illustrating various proposed constructions of the "light pipe" referred to above. In another embodiment of the present invention a light-diffusing, polarisation-maintaining sheet or layer of substantially the same kind as described above in relation to FIGS. 1 and 2 may be interposed between the emissive surface of the light-pipe of the M. Suzuki et al article and the LCD display or cell.

In a yet further embodiment, the cholesteric filter or reflector of the arrangement described with reference to FIG. 2 herein may be replaced by some other type of reflective polariser, which may comprise a plate-like structure interposed between a back-lighting arrangement of the kind discussed with reference to FIG. 2 herein and the liquid crystal cell and which structure may, for example, comprise, in manner similar to the "light-pipe" of the M. Suzuki et al article, a plurality of superimposed inclined layers of transparent materials of different reproductive indices. In this yet further embodiment, a polarisation-maintaining, light-diffusing sheet or layer may again be disposed between the back-lighting assembly and the reflective polariser. The quarter wavelength plate of the embodiment of FIG. 2 may be dispensed with in the last-noted variant and/or may be incorporated at an appropriate location or locations within the plate-like structure incorporating the polarising reflector.

It will be appreciated that the combination of the light tube with the "light pipe" discussed above with reference to FIG. 3, and described in the M. Suzuki et al paper referred to above, may, considered as a whole, be regarded as a light-generating "black box" producing intrinsically polarised light. Other light sources are known, for example, appropriately designed lasers, which also produce intrinsically polarised light and whilst it may not, at the present level of technology, be practicable or advisable to incorporate these in LCD display devices, it will be appreciated that the use of polarisation-maintaining diffusers, as referred to above, is in principle equally applicable to arrangements utilising such intrinsically polarised light sources as are, or may become, practicable. It will be understood that where an intrinsically polarised light source is used, it may be possible to dispense with the inner or rear polariser in an LCD display.

It will be understood that other optical arrangements can be utilised which affect polarisation, such as arrangements utilising quarter-wavelength plates, etc., in other embodiments of the invention and which likewise take advantage of the properties of polarisation-maintaining diffusers. These optical arrangements will be evident to those skilled in the art.

As noted above a diffuser may be formed as a coating upon a substrate, which substrate may, for example, be a polarising sheet of an LCD display, or a touchscreen.

It will be understood that where a diffuser, whether in the form of a coating, or a separately formed sheet or lamina, is disposed on the outer side of the outer polariser or analyser of an LCD, there is no necessity for it to be polarisation maintaining, so that the material of such a diffuser, in the form of an outer coating, may be selected with some freedom and, in particular, may be selected and treated so as to form an effective protective coating or hardcoat for such analyser or touchscreen.

The diffuser may, for example, be applied in the form of a fluid applied to the substrate and subsequently cured thermally or by ultra-violet radiation and treated, for example selectively exposed as described in one or more of EP-A-0294122; U.S. Pat. No. 5442482; WO94/29768 or WO96/20419 so as to encode appropriate phase structures, such as graded refractive index lenses, into or onto the coating. Such coating may thus serve as a depixelator and as a means of increasing the angle of view of the display, as well as affording physical protection for the substrate.

It is known to provide an LCD display, for example, associated with a portable computer, which in conditions of low ambient lighting can be illuminated by a back-lighting arrangement incorporated in the display and including a light source disposed behind the LCD cell or cells but in which the back lighting arrangement can be switched off, to conserve battery power, in high ambient lighting conditions. To this end a so-called transflector, i.e. a semi-reflective or "half-silvered" plate is interposed between the light source and the LCD cell or cells, the semi-reflective plate typically transmitting 20% of the light falling on it and reflecting the remaining 80% of the light.

As described below with reference to FIG. 4, the present invention may be applied advantageously to an LCD display of this kind.

Figure 4:
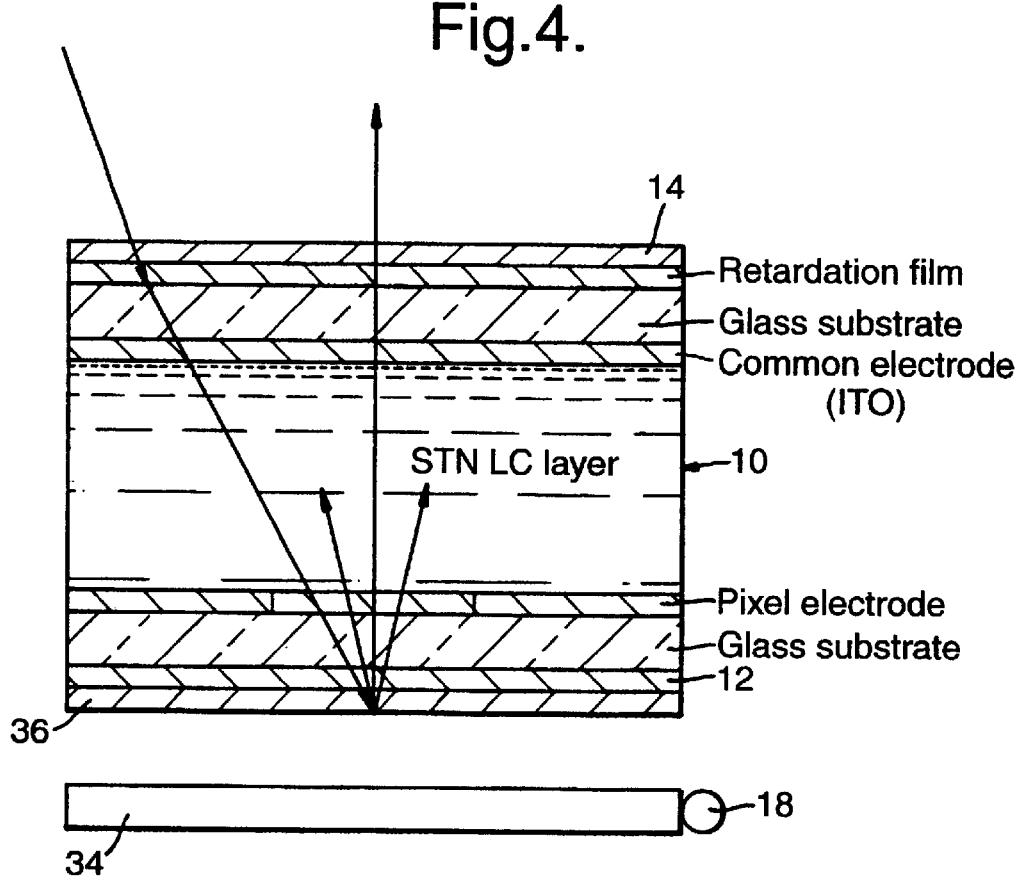
FIG. 4 is a schematic sectional view of part of an LCD screen embodying the invention in another of its aspects.

Referring to FIG. 4, references 18 and 34 again indicate a tubular fluorescent lamp and a light-guide structure respectively, reference 10 indicates an LCD cell comprising a liquid crystal medium accommodated between opposing parallel sets of electrodes carried by respective glass substrates and reference 14 again represents the front polariser.

In the arrangement of FIG. 14 reference 36 indicates a sheet of light diffusing material which has at least one surface thereof rendered partially light transmissive and partially light reflective by a tenuous layer of aluminium vapour deposited thereon by a technique known per se for producing "half-silvered" mirrors and the like. The partially reflective deposit may, of course, be of any other appropriate metal and may be applied by any other particle deposition technique, such as precipitation of silver from a solution of a silver salt, or even by etching of an array of minute apertures in an initially continuous layer. The light diffusing sheet material may be of any kind, for example utilising roughened or lenticular surfaces or incorporating light scattering particles or bodies. However, particularly if the partially reflective deposit is carried by the underside of the sheet 36, i.e. on the surface of sheet 36 remote from LCD cell 10, the sheet 36 preferably comprises a photopolymer incorporating graded refractive index optical features, and/ or surface relief optical features, produced by exposure of an appropriate photopolymerisable material, e.g. one or other of those specified above, to a pattern of localised variation in illumination by polymerising light. Thus, the diffuser may be of the kind disclosed as the preferred embodiment in WO94/29768, so that, as described with reference to FIG. 2 above, the polarisation of light passing through the display from the surroundings to strike the partially reflective layer for reflection back through the display is preserved.

In yet a further embodiment of the invention an LCD display may correspond with that illustrated in FIG. 4 and described above with reference to FIG. 4, but with the sheet 36 having its aluminised surface so densely coated with aluminium as to be non light-transmissive and fully light-reflective, with the lamp 14 and light-guide structure 34 being omitted, the display in this embodiment being intended solely for viewing in ambient light. Thus, in this embodiment, the sheet 36 is light-diffusing and fully light-reflecting.

What is claimed is:

1. An apparatus for maintaining and converting a localized polarization shift into a localized intensity variation in a liquid crystal display assembly, the apparatus comprising:

a liquid crystal display having a back side and a front side;

a polarization-maintaining, light-diffusing layer adjacent to the front side of the liquid crystal display, said light-diffusing layer comprising a photopolymer incorporating graded refractive index optical features; and a front light-polarizing layer disposed adjacent to the polarization-maintaining, light-diffusing layer, wherein the liquid crystal display generates a localized polarization shift, the polarization-maintaining, light-diffusing layer maintains the localized polarization shift generated by the liquid crystal display, and the front light-polarizing layer converts the localized polarization shift into a localized intensity variation.

2. The apparatus of claim 1 further comprising a back light-polarizing layer disposed on the back side of the liquid crystal display.

3. The apparatus of claim 1 wherein the polarization-maintaining, light-diffusing layer is a light-diffusing coating and the light-diffusing layer coats the front light-polarizing layer.

* * * * *